July 2, 1963 W. J. OWENS 3,096,085
INDEPENDENT TORSION BAR SUSPENSION UNIT
Filed Jan. 23, 1961
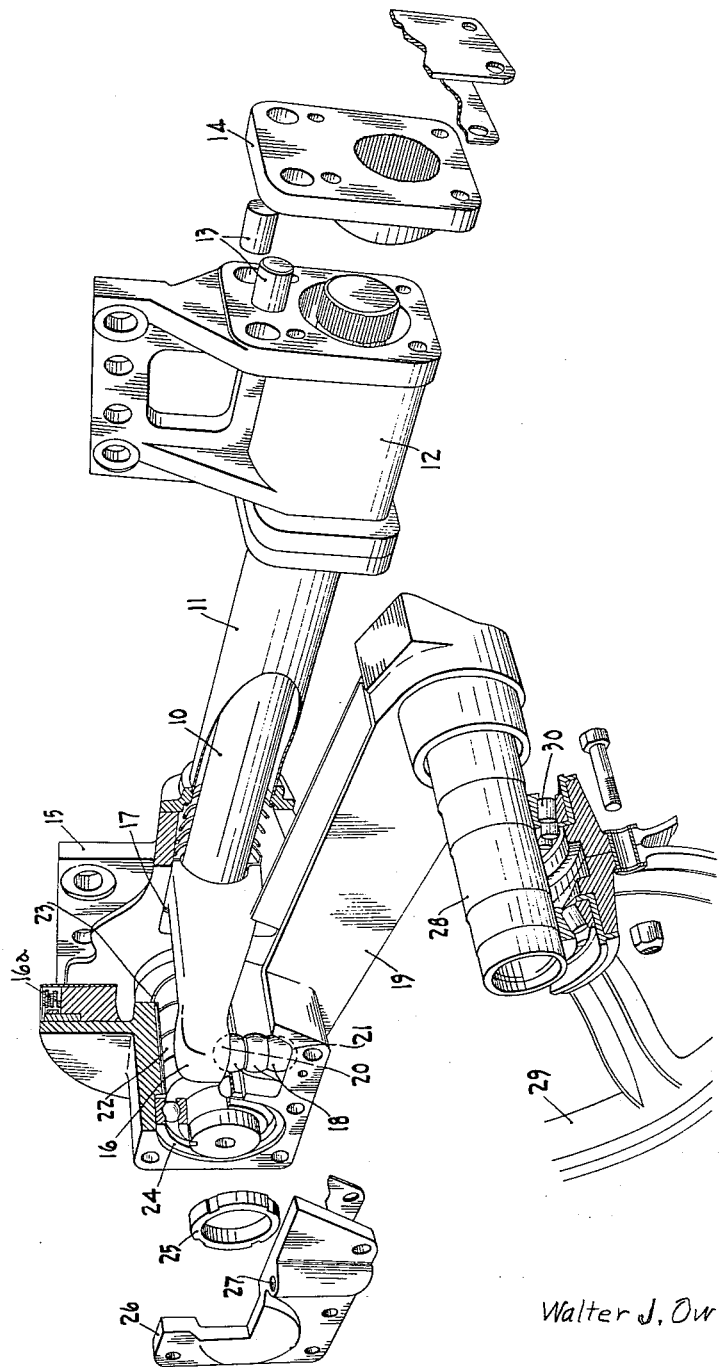
Inventor
Walter J. Owens
By Stevens, Davis, Miller & Mosher
Attorneys US United States Patent Office 3,096,085
Patented July 2, 1963

3,096,085
INDEPENDENT TORSION BAR SUSPENSION UNIT
Walter J. Owens, Ottawa, Ontario, Canada, assignor to Her Majesty the Queen in right of Canada as represented by the Minister of National Defence
Filed Jan. 23, 1961, Ser. No. 84,121
1 Claim. (Cl. 267—57)

This invention relates to a torsion bar suspension unit for a vehicle wheel.

Torsion bar suspension systems are frequently used on vehicles to provide resilient wheel suspension. In known torsion bar systems the torsion bar is located substantially at right angles to the wheel supporting member and is fixed at one end to the vehicle and at the other end to the suspension member. Vertical motion of the vehicle wheel then results in twisting of the torsion bar in such a manner as to resist the vertical motion. These known torsion bar suspension systems have been of considerable size because the torsion bar and the wheel supporting member have been at right angles to each other and it has heretofore been impossible to produce a compact torsion bar suspension unit.

The present invention provides an independent torsion bar suspension unit which may be readily attached to the body of the vehicle or its chassis and which overcomes the size disadvantages of known suspension units by positioning the suspension member carrying the wheel in a plane parallel to the longitudinal axis of the torsion bar.

In accordance with the invention an independent wheel suspension unit comprises a torsion bar fixed at one end to the vehicle, a torsion arm fixed to the other end of the torsion bar, a trailing arm supporting a wheel spindle at one end and pivotally attached at its other end to the vehicle so that the plane of motion of the trailing arm is substantially parallel to the longitudinal axis of the torsion bar, and means coupling the torsion arm to the trailing arm whereby pivotal motion of the trailing arm is transformed into twisting or torsion stress in the torsion bar.

The use of such a suspension unit means there are no rigid arms or axles in the vehicle and each wheel is free to move independently without transmitting any reaction to the remaining wheels.

The drawing shows a view partly in section of an embodiment of the invention wherein portions have been broken away to show the internal construction. A torsion bar 10 is concentrically mounted in a housing 11 at one end of which is an anchor bracket 12 with dowels 13 to receive an anchor plate 14 which fixedly secures the torsion bar 10. The other end of the torsion bar 10 is enclosed in a second housing 15 and is splined to a torsion arm 16 which is supported in the housing 15 on plastic bearings 17.

A ball and socket joint 18 couples the torsion arm 16 to a trailing arm 19. The term ball and socket joint is used to describe a coupling device of the type shown in the drawing and is intended to include such coupling devices employing such numbers of balls and sockets as may be required. In the embodiment shown in the drawing there is a concave surface 20 on the underside of the coupled end of the torsion arm and a similar concave surface 21 on the trailing arm to receive the balls of the ball and socket joint 18.

The housing 15 contains a sealing medium 16a to prevent water and dirt entering between the exposed surfaces of the mating parts of housing 15 and trailing arm 19 and also contains a journal 22 to which trailing arm 19 is pivotally attached. Trailing arm 19 contains suitable radial bearings 23 of the sleeve type preferably constructed of sheet plastic material to minimize friction and ball bearings 24 which absorb side thrust. The assembly is locked in position by sleeve nut 25 which is protected by casting 26 in which is an oil reservoir 27 to lubricate ball and socket joint 18.

A spindle 28 is located at the free end of the trailing arm 19 and supports vehicle wheel 29. Conventional anti-friction roller bearings 30 are employed in the wheel 29 spindle 28 assembly. The trailing arm 19 pivots about journal 22 with the rise and fall of wheel 29. The ball and socket joint 18 transmits the pivotal motion of the trailing arm from such rise and fall to the torsion arm 16 where it is transmitted to the torsion bar 10 and winds and unwinds the torsion bar 10 about its anchor plate 14 thus providing the resilience for the functioning of the suspension assembly.

In the illustrated embodiment the suspension unit is attached to the vehicle frame through the anchor bracket 12 and the housing 15. However, the anchor bracket 12 and the housing 11 can, if desired, be made integral with the housing 15 in which case the unit may be attached to the vehicle frame at a single station such as that formed by housing 15 in the illustrated embodiment.

The torsion bar suspension unit just described is capable of application to both highway and off-highway or cross-country vehicles. The suspension unit may be externally mounted on hull type vehicles and occupies a minimum of external and no internal space. The whole assembly is completely sealed against the ingressive water, mud or dirt and is thus highly suitable for vehicles negotiating marshy or wet terrain and for vehicles operating on highways.

Where desirable, the spring rate of the suspension unit, which may be defined as the load required to produce a given wheel deflection, can be varied within the framework of the standard components disclosed in the drawing by providing alternative seatings (not shown) on the torsion arm 16 and on the trailing arm 19 for the balls of the ball and socket joint 18. The increase in spring rate possible is governed only by physical consideration such as bearing loads and material strengths.

I claim:
An independent suspension unit for a vehicle wheel comprising a torsion bar enclosed throughout its length by a housing and fixed at one end to the vehicle through said housing, a torsion arm with one end thereof housed and fixed to the free end of the torsion bar, an elongated trailing arm supporting a wheel spindle at one end and pivotally connected at its other end to a shaft projecting from and fixed to said torsion arm housing, said trailing arm and said torsion bar being normally disposed in side-by-side relationship with their longitudinal axes substantially parallel, the plane of motion of the trailing arm being substantially parallel to the longitudinal axis of the torsion bar, and a ball and socket joint coupling the free end of the torsion arm to the trailing arm adjacent the connection of the trailing arm to the vehicle whereby reciprocating, pivotal motion of the trailing arm causes displacement of the coupling end of the torsion arm occasioning twisting or torsion stress in the torsion bar; and whereby the spindle end of the trailing arm is adapted for comparatively greater displacement than the coupling end of the torsion arm.

References Cited in the file of this patent
UNITED STATES PATENTS
2,174,996   Rabe _____ Oct. 3, 1939
2,220,916   Schiff _____ Nov. 12, 1940
2,606,759   Colby _____ Aug. 12, 1952